Figure 1:
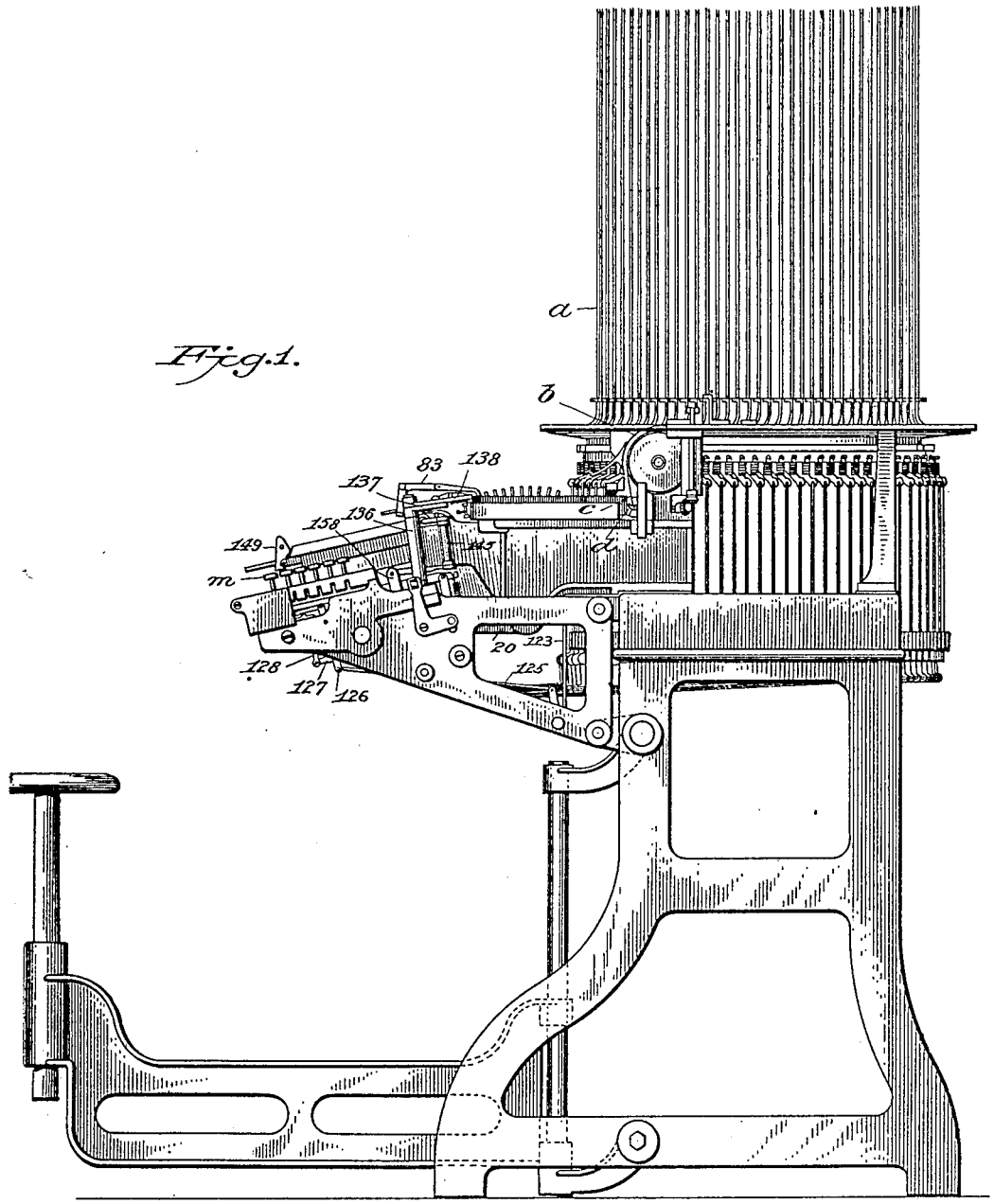

No. 665,406. Patented Jan. 8, 1901.
P. F. COX.
TYPE SETTING MACHINE.
(Application filed Apr. 2, 1900.)
(No Model.) 10 Sheets—Sheet 1.

Witnesses
G. S. Elliott.
James R. Mansfield.

Inventor:
Paul F. Cox,
by Alexander & Dowell
Attorneys

No. 665,406. Patented Jan. 8, 1901.
P. F. COX.
TYPE SETTING MACHINE.
(Application filed Apr. 2, 1900.)
(No Model.) 10 Sheets—Sheet 4.

Witnesses
G. S. Elliott.
James R Mansfield.

Inventor:
Paul F. Cox,
By Alexander & Dowell
Attorneys

No. 665,406. Patented Jan. 8, 1901.
P. F. COX.
TYPE SETTING MACHINE.
(Application filed Apr. 2, 1900.)
(No Model.) 10 Sheets—Sheet 5.
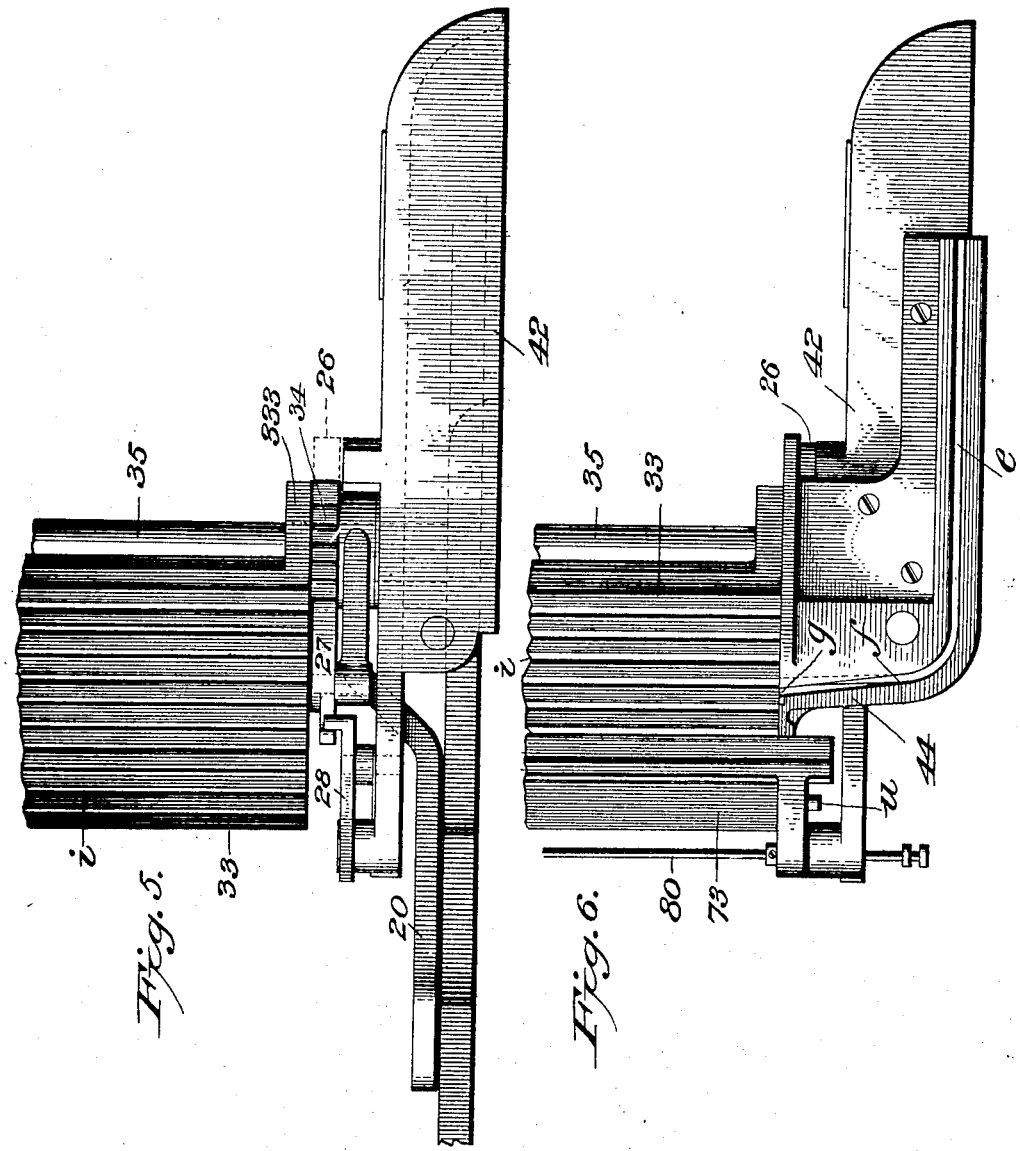

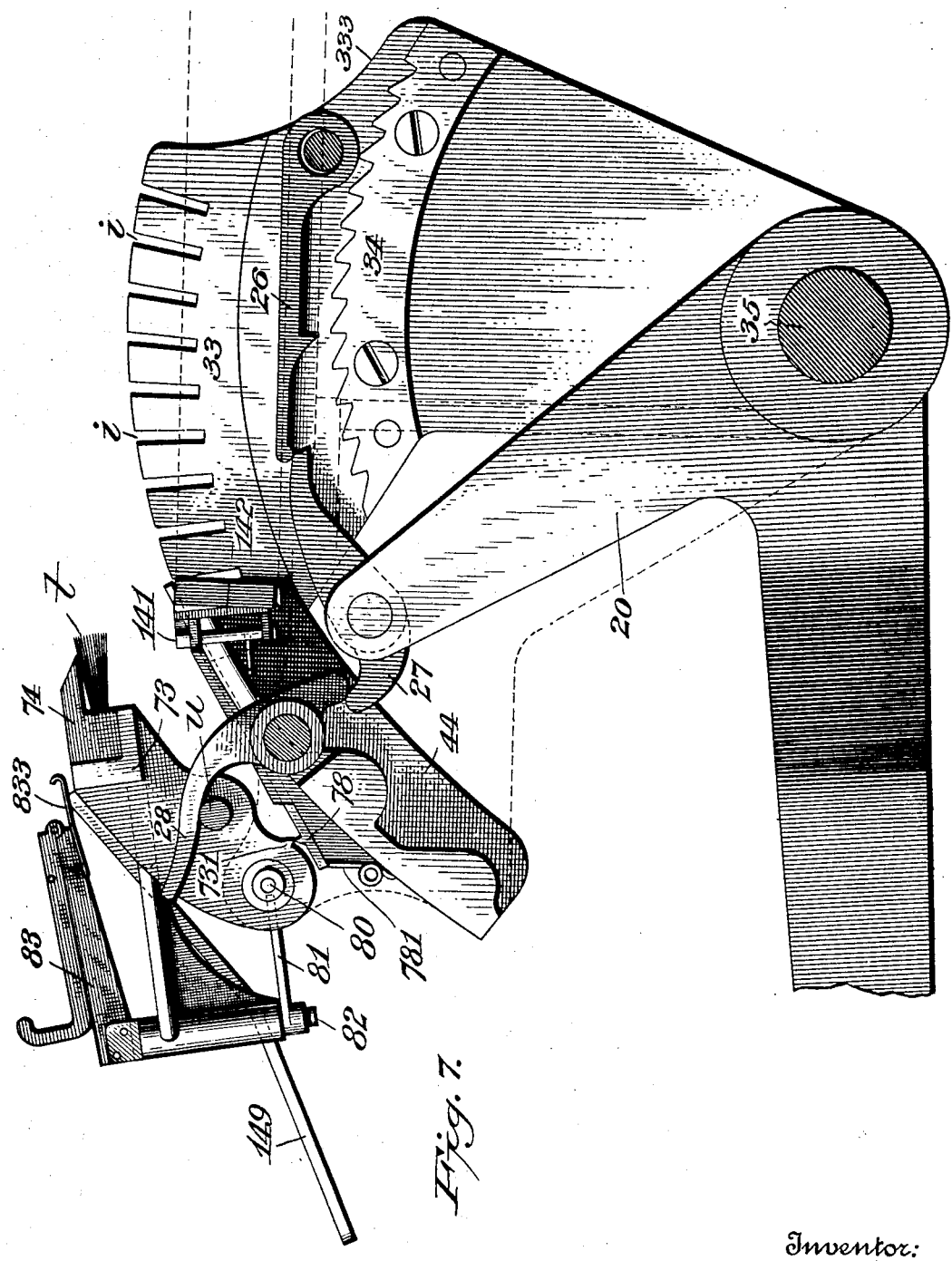

No. 665,406. Patented Jan. 8, 1901.
P. F. COX.
TYPE SETTING MACHINE.
(Application filed Apr. 2, 1900.)
(No Model.) 10 Sheets—Sheet 7.

Witnesses
G. S. Elliott.
James R. Mansfield.

Inventor:
Paul F. Cox,
By
Alexander & Dowell
Attorneys

No. 665,406. Patented Jan. 8, 1901.
P. F. COX.
TYPE SETTING MACHINE.
(Application filed Apr. 2, 1900.)
(No Model.) 10 Sheets—Sheet 8.
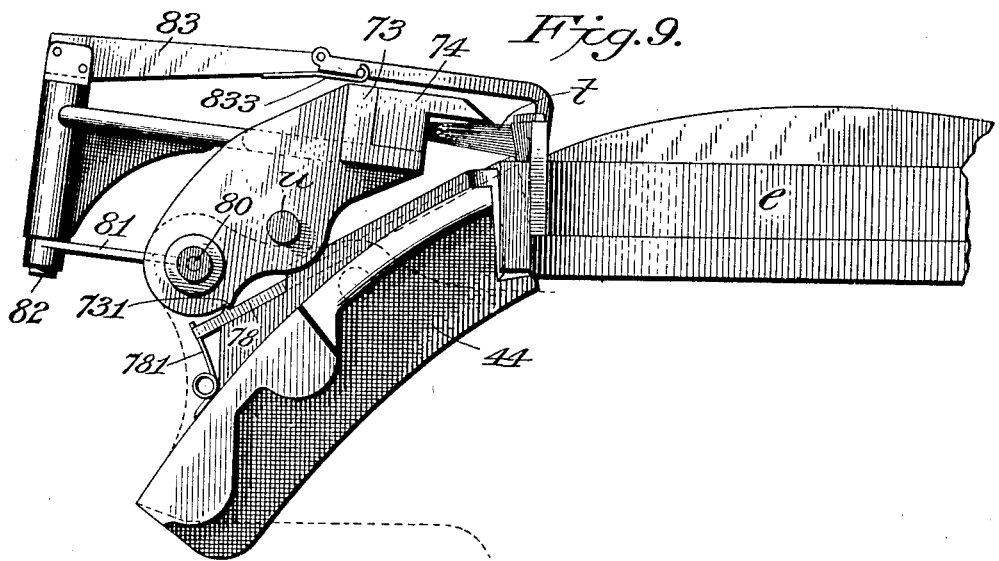
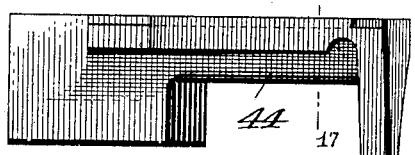
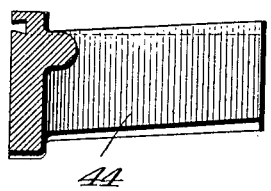
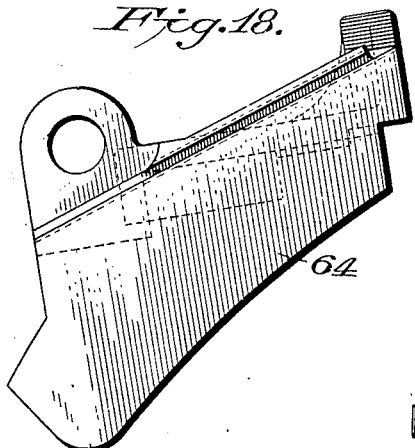
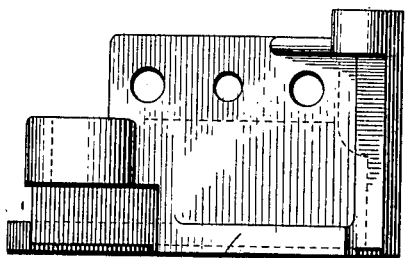
Witnesses
G. S. Elliott
James R. Mansfield
Inventor:
Paul F. Cox
By Alexander & Dowell
Attorneys No. 665,406. Patented Jan. 8, 1901.
P. F. COX.
TYPE SETTING MACHINE.
(Application filed Apr. 2, 1900.)
(No Model.) 10 Sheets—Sheet 9.
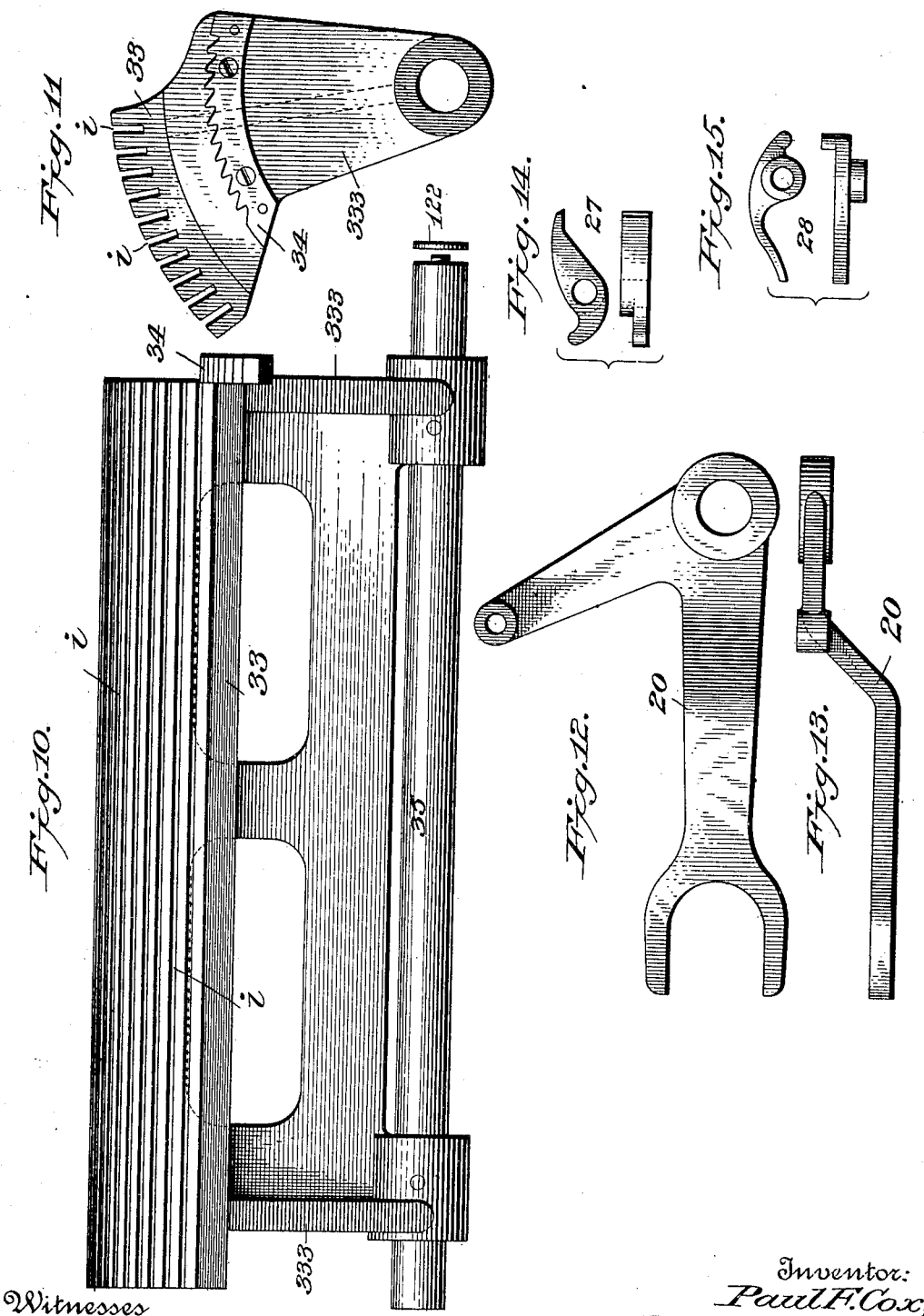

No. 665,406. Patented Jan. 8, 1901.
P. F. COX.
TYPE SETTING MACHINE.
(Application filed Apr. 2, 1900.)
(No Model.) 10 Sheets—Sheet 10.

Witnesses
G. S. Elliott.
James R. Mansfield.

Inventor:
Paul F. Cox,
By:
Alexander & Dowell
Attorneys

UNITED STATES PATENT OFFICE.

PAUL FLEMMING COX, OF NEW YORK, N. Y., ASSIGNOR TO THE UNITYPE COMPANY, OF SAME PLACE.

TYPE-SETTING MACHINE.

SPECIFICATION forming part of Letters Patent No. 665,406, dated January 8, 1901.

Application filed April 2, 1900. Serial No. 11,190. (No model.)

*To all whom it may concern:*

Be it known that I, PAUL FLEMMING COX, of New York, in the county of New York and State of New York, have invented certain new and useful Improvements in Type-Setting Machines; and I hereby declare that the following is a full, clear, and exact description thereof, reference being had to the accompanying drawings, which form part of this specification.

This invention is an improvement in type-setting machines wherein composed type are justified by hand subsequent to their composition; and the objects of the invention are, first, to enable the operator to compose a large quantity of type before having to stop to justify the same; second, to provide a type-holder wherein separate lines of the composed type may be contained until the operator is ready to justify the same; third, to provide novel mechanism for shifting this holder whenever one of its channels is filled, so as to move the filled channel out of the way and bring a new line into position to be filled; fourth, to provide novel mechanism whereby when the last channel in the holder is filled the keyboard will be locked, so that the compositor cannot proceed with the composition until the holder is wholly reset or partially emptied and reset, the machine thus automatically indicating to the operator when he must proceed with the justification, and, fifth, to provide means whereby when the lines have been removed from the holder it may be brought into position to again commence the setting operation.

Among the advantages of the invention are, first, the lines of composed type are directly in front and in plain view of the operator at all times; second, he does not have to stop the composing operation until the holder is completely filled, when he is obliged to stop by reason of the automatic locking of the keyboard, and, third, whenever a channel in the holder is filled with type the holder is automatically shifted so as to bring a fresh channel into position without necessitating any attention on the part of the operator. Thus by providing a reservoir wherein a large number of lines or quantity of type can be composed before justification much time is saved in shifting and manipulation of parts.

Heretofore in continuous-line machines of this nature the operator has only been able to compose one long line and then stop and justify the same before he can proceed with the composing operation, and these numerous interruptions (at the end of each line) cause much loss of time and divert his attention from his copy. Another advantage of the invention is that after the line-holder is filled it can be dropped back into the most convenient position to enable the operator to justify the several lines in the order of their composition and to remove the justified lines therefrom, and after the justified lines have been removed from the holder it is dropped back to starting position and composition is recommenced.

The invention is shown applied to a cylinder type-setting machine of the "Simplex" type, but of course is not limited to its connection with such a machine, and is particularly adapted to use with the composing mechanisms of such machines as are shown in my applications for patent, Serial No. 727,095, filed August 14, 1899, and Serial No. 728,965, filed August 30, 1899.

The present invention has no particular reference either to the type-reservoir or to the manner of ejecting the type therefrom or to the particular manner of assembling the type as composed, and therefore I have not deemed it necessary to illustrate in the drawings the means for ejecting the type from the reservoir nor the particular key connections for this purpose, except so much of the latter as is necessary to make clear the keyboard-locking mechanism.

The novel features of the present invention are summarized in the claims, and in the accompanying drawings I have illustrated the invention fully in connection with such parts of a type-setting machine as will facilitate a full and clear understanding of the invention.

I do not limit myself to the particular construction of elements herein shown and described except where specifically claimed, and with this understanding shall proceed to describe the invention with reference to the accompanying drawings, in which—

Figure 2:
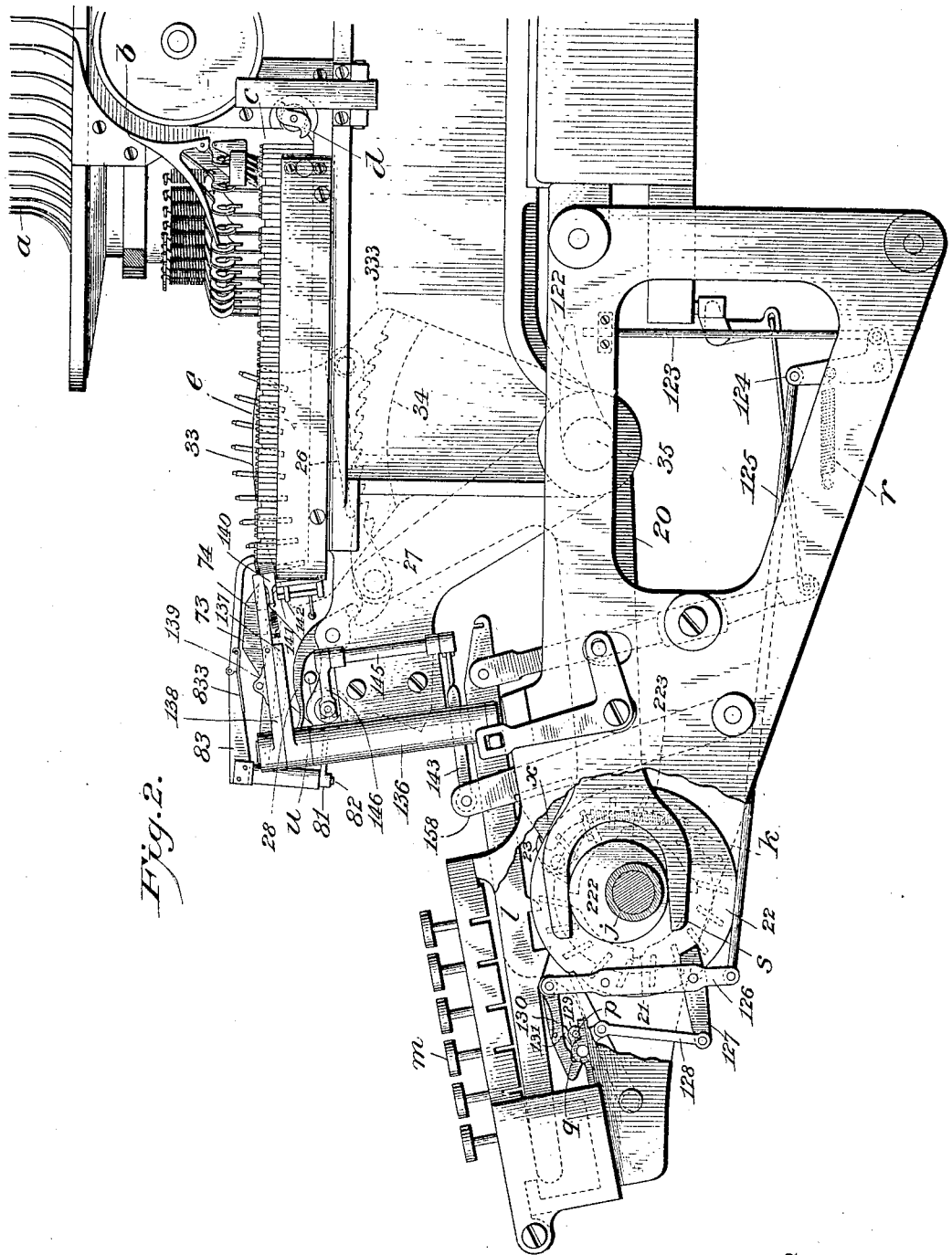
Figure 3:
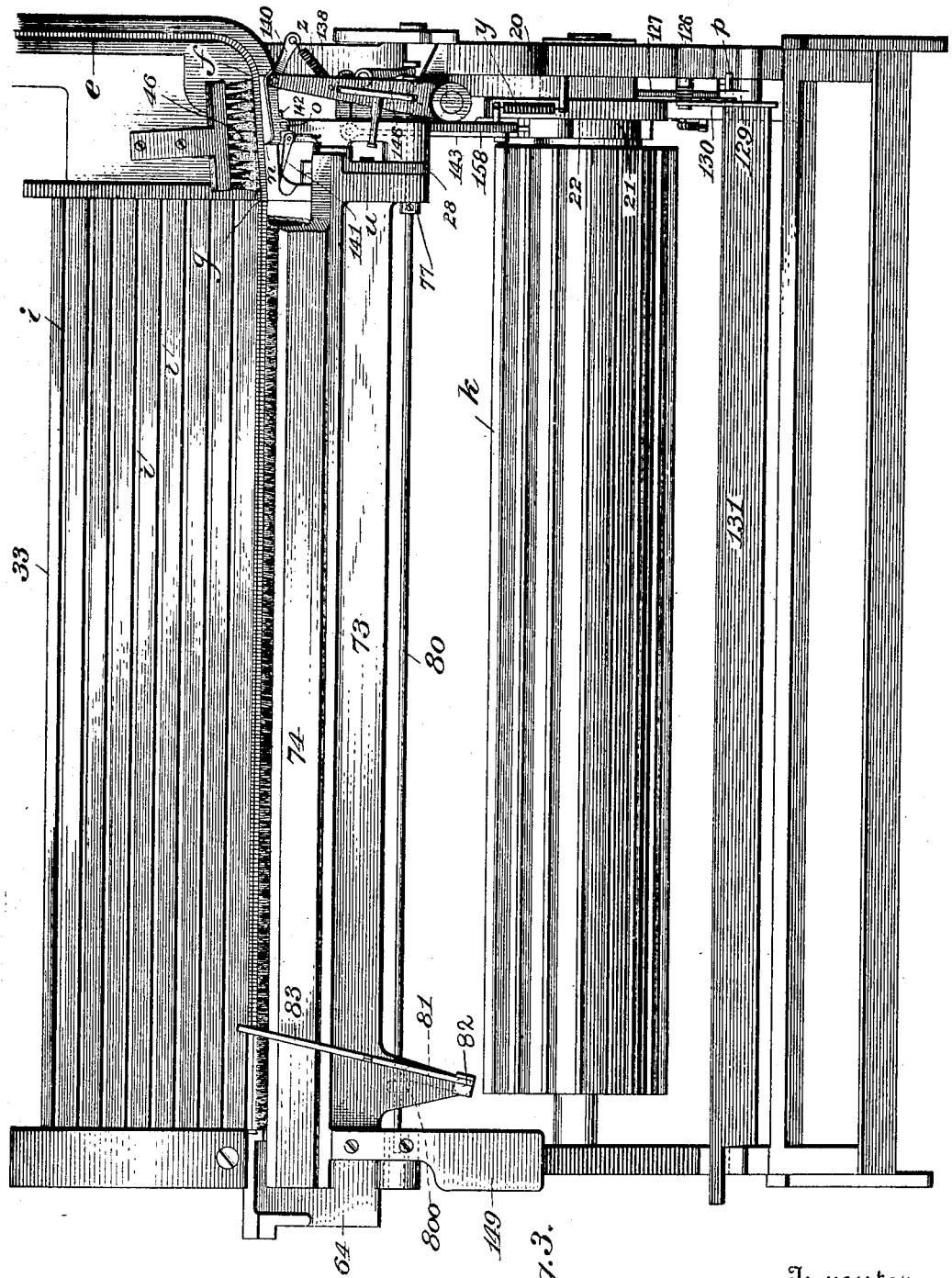
Figure 4:
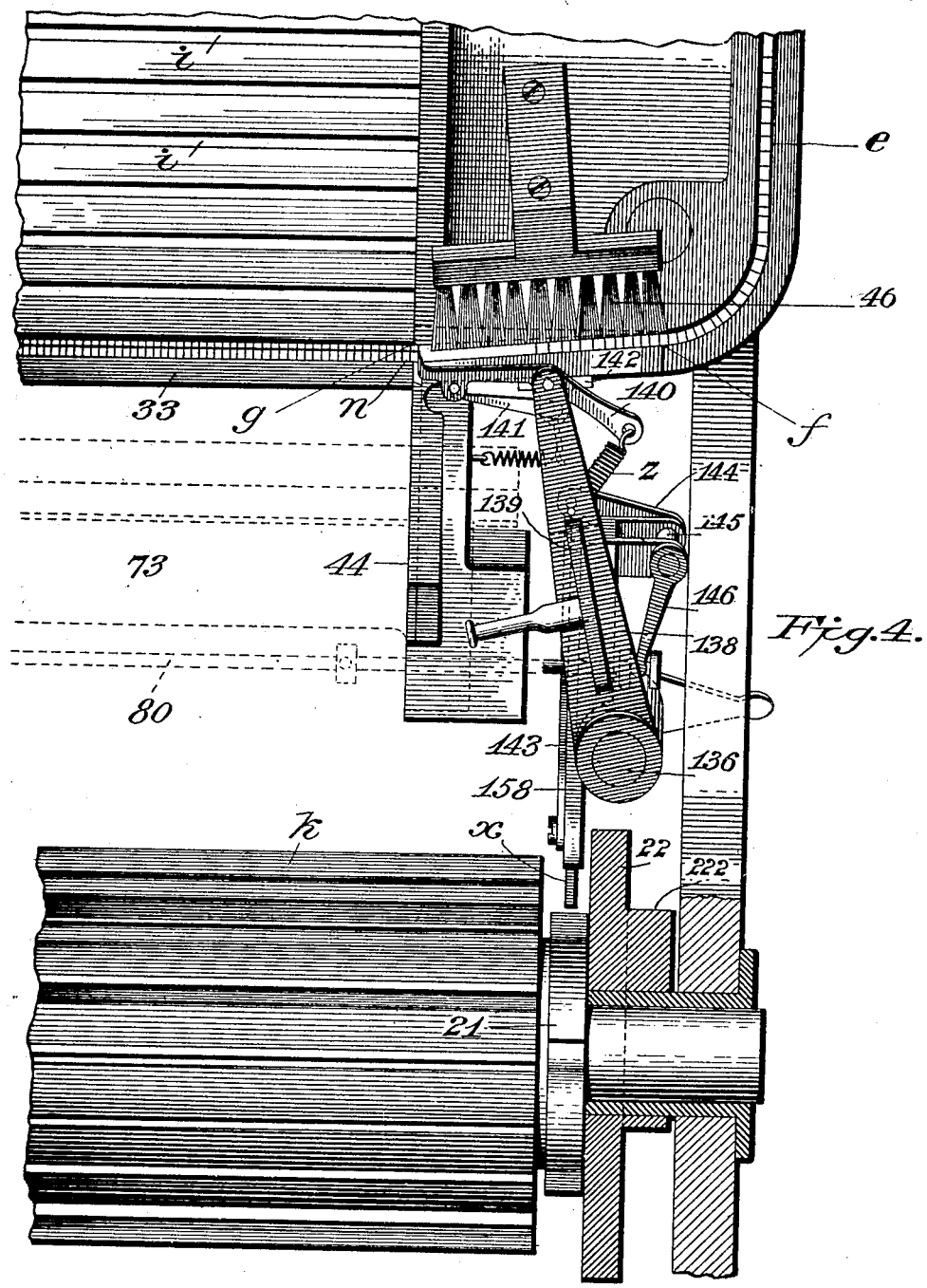
Figure 8:
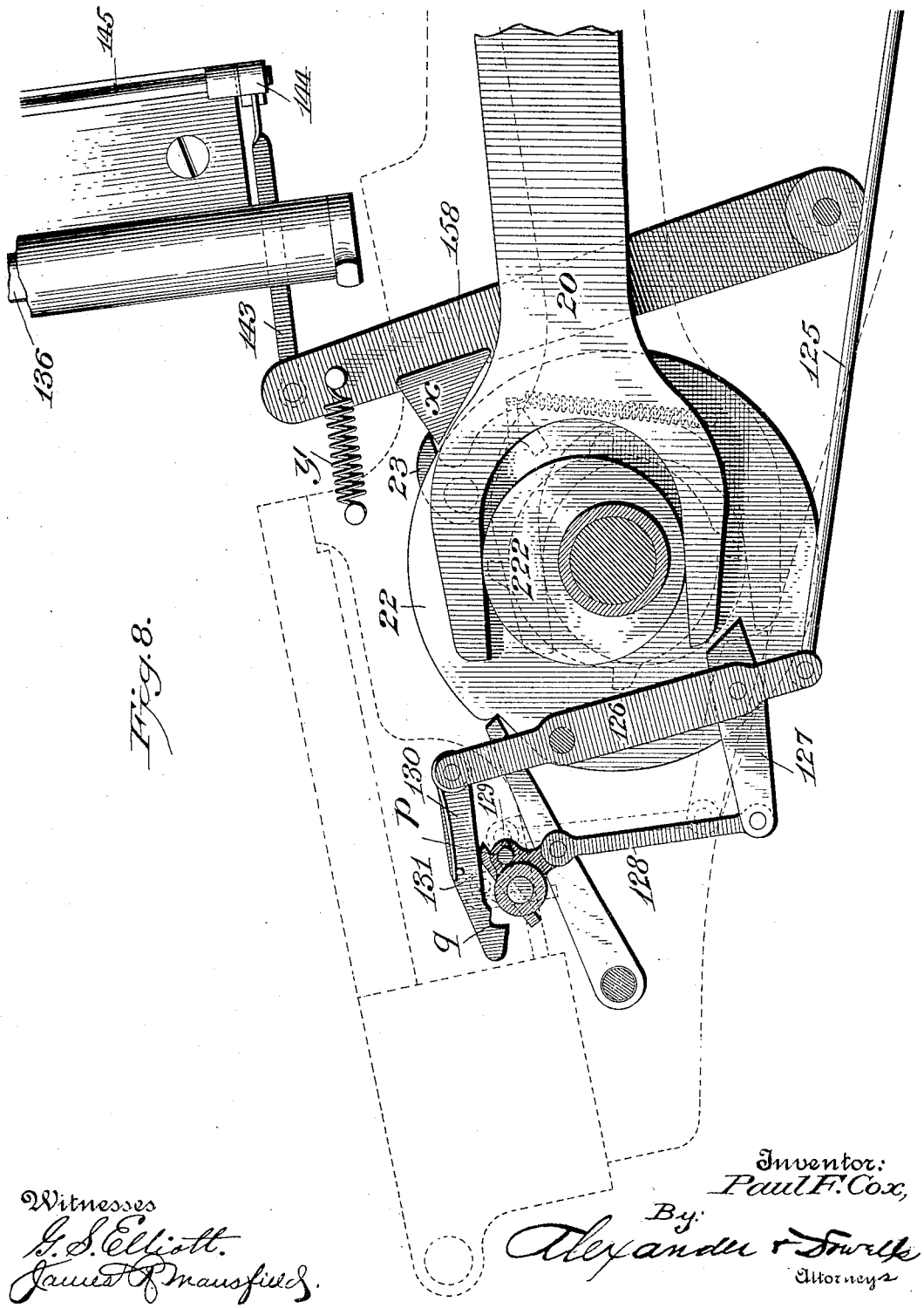
Figure 20:
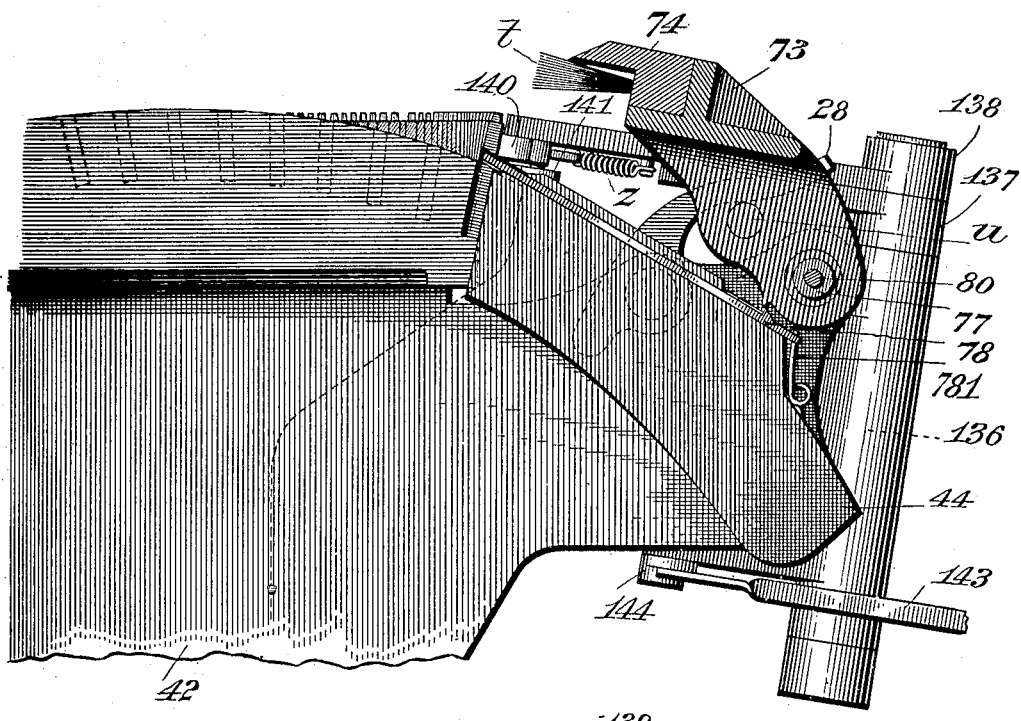
Figure 21:
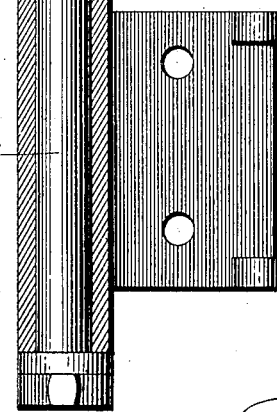

Figure 1 is an end elevation of the complete apparatus. Fig. 2 is an enlarged end elevation of the composing apparatus, partly in section. Fig. 3 is an enlarged top plan view of the type-holder and various devices coöperating therewith. Fig. 4 is a further enlarged top plan view of the mechanism for forwarding the lines rapidly into the holder-channels. Fig. 5 is a detail view of the operating devices of the holder with the channel-plate removed. Fig. 6 is a somewhat similar view showing the channel-plate in position. Fig. 7 is an enlarged view, partly in section, of the line-holder and part of its operating devices. Fig. 8 is a view of an automatic tripping mechanism for operating the holder and locking the key-bars. Fig. 9 is a detailed view of the brush-holder, showing it in a different position from that shown in Fig. 7. Figs. 10 and 11 are detail side and end views of the holder detached. Figs. 12, 13, 14, and 15 are detail views of parts of the operating devices. Figs. 16 and 17 are detail views of casting 44. Figs. 18 and 19 are detail views of casting 64. Fig. 20 is a detail view looking at the discharge end of the line-holder, showing the brush-holder elevated and the line-channel closed; and Fig. 21 is a detail view of the operating devices for the line-forwarding arm 138.

$a$ designates the type-reservoir, from which the type may be ejected and forwarded successively by suitable mechanism (not shown) into a channel $b$, through which they are directed to the composing-point $c$ in front of the rotating setter or pusher $d$, by which the type are forwarded as composed into a line-channel $e$. This channel is deflected between the points $f$ and $g$ on an angle of ninety degrees, so that the type when ejected into the channels of the holder shall be directly in front of the operator. This type-line holder is preferably composed of a curved segment 33, provided at its ends with supporting end pieces 333, by which it is supported upon a shaft 35, which is journaled in bearings in brackets attached to the main frame of the machine. The line-holder is provided with a series of type-holding channels $i$, which are cut slightly tangential to the axis of the segment 33 for the purpose of bringing them properly in line with the end of the type-slot $e$ at the point $g$, which inclines laterally slightly toward the operator. The structure of the holder is such that it will fall forward or toward the operator by gravity. One of the end pieces 333 is provided with a ratchet-segment 34, which is engaged by a catch 26, pivoted on the bracket 42, which prevents the holder dropping until the catch is disengaged, and said catch will always lock the holder in such position that one of its channels $i$ will register with the channel $e$. At the commencement of the composing operation the holder is dropped forward so as to bring its last or rearmost channel into register with the line-channel $e$ at the point $g$, and when such type-channel is filled the holder is automatically moved so as to bring an empty channel into position for filling by the following means:

27 designates a pawl adapted to engage the ratchet 34 and pivotally mounted on one arm of a bell-crank lever 20, which is loosely pivoted on the shaft 35 beside the bracket 42. The other arm of this lever extends forwardly and is bifurcated to embrace an eccentric cam 222 attached to a cam-disk 22, loosely mounted on the shaft or bushing $j$ of the rotating rib-cylinder $k$, the ribs of which are adapted to engage and operate the pushers $l$ of the type-ejecting mechanism when said bars are depressed by the keys $m$. The cylinder $k$, bars $l$, and keys $m$ form no part of the present invention and are well known in machines now in use, and therefore need no further detailed description or illustration herein. Suffice it to say that whenever a key $m$ is depressed it depresses the corresponding bar $l$ until the notch therein is engaged by one of the ribs on the cylinder, whereupon the bar is thrown forward and through suitable connections (not shown) the corresponding type is ejected from the type-reservoir $a$. The cam-disk 22 being loose does not rotate with the cylinder except when locked thereto at the proper time by suitable clutch mechanism, preferably constructed as follows:

On the end of the cylinder $k$ is keyed a ratchet 21, which rotates beside the cam-disk 22. On the face of cam-disk 22, at the side next this ratchet 21, is pivoted a dog 23, which is normally held out of engagement with the ratchet 21 by contact with a lug $x$ on the lever 138, pivoted beside the cam-disk. The spring 223 is attached to the dog and disk and will cause the dog to engage the ratchet 21 whenever the dog is released by the proper movement of lever 158. Therefore as soon as the lever releases the dog the spring throws it into engagement with the ratchet 21, which immediately carries the dog and the cam once around, thereby rocking the lever 20 and causing dog 27, through ratchet 34, to move the line-holder a distance of one channel, and thus bring a fresh empty channel $i$ into register with the type-channel $e$ at the point $g$. The lever 158 as soon as it releases the dog is immediately thrown back into position to reëngage the same, so that when the cam has made one revolution with the rib-cylinder $k$ the dog 23 is engaged by the lug $x$ on lever 158 and thrown out of engagement with the ratchet 21, so that the line-holder will not be again moved until the empty channel is filled or lever 158 again tripped. Preferably the lever 158 is automatically tripped upon the filling of a channel $i$ with type by the following mechanism:

83 designates a trip-lever, which is pivoted on a suitable support near the left-hand end of the type-line holder and, as shown, is pivoted upon a shaft 82, which is suitably journaled in a bearing on the brush-holding casting 73. (See Figs. 3 and 7.) Preferably the lever 83 is pivoted to the shaft 82 in such manner that the trip-lever can be lifted up and thrown back out of the way when desired; but when in operative position it is held down in position by means of a spring 833, as indicated in the drawings.

On the lower end of shaft 82 is a crank 81, which projects rearwardly toward a rod 80, which lies parallel with but below the brush-holder and is provided with a stop 800, with which the end of the lever 81 engages. This rod 80 extends to and beyond the right-hand end of the line-holder and has a grooved collar on its outer end which is engaged by an arm 146 on the upper end of a substantially vertical rock-shaft 145, on the lower end of which is a crank 144, connected by a link 143 to the upper end of lever 158.

When in operative position, the end of trip-lever 83 lies over the end of that channel $i$ into which the type are being forwarded, and when this channel is nearly filled the incoming type strike the trip-lever 83 and push it to the left until it is moved so far as to cause lever 81 to engage stop 800 and force rod 80 also to the left, and thereby (through the connections 146 145 144 143) to move lever 158 and cause it to disengage dog 23, whereupon the cam-disk 22 will be locked to the cylinder $k$ and the lever 20 will be actuated, as described, so as to move the line-holder rearward one notch taking the filled channel $i$ out of the way and bringing an empty channel into register with the channel $e$. As soon as the holder is shifted the parts are thrown back to normal position by means of the spring $y$, connected to lever 158, as shown, or located at some other convenient point. The inward movement of lever 158 may be regulated by any suitable stop and may be conveniently done by means of an adjustable collar 77 on rod 80, as shown in Fig. 3.

In order to enable the compositor to continue the composing operation without interruption during this shifting of the line-holder, it is desirable to trip the line-holder-shifting mechanism just before the channel is completely filled with type, and then after such mechanism is tripped and before the holder is shifted to quickly forward into such channel sufficient type from the channel $e$ to complete the line, this partial emptying of the channel $e$ enabling the composition to be continued during the short interval occupied in shifting the line-holder. I have provided mechanism for doing this, which mechanism is actuated by the same mechanism that actuates the line-holder, but is timed so as to operate in the moment before the line-holder is shifted. This mechanism is as follows: Preferably between the points $f$ and $g$ the composing-channel $e$ is deflected or twisted laterally in such manner that the type passing therethrough will be thrown slightly out of alinement, (see Fig. 20,) so that the forward type will slightly project laterally in front of the preceding type, and opposite this point in the line is a type forwarding and pushing device 140, pivoted on the end of a lever 138, and having a tooth $n$ lying close to the line of type in channel $e$, but being held out of engagement therewith in the normal position of the parts by means of a pin or roller $o$ on the rear side of the pusher 140, which pin $o$ bears against a rib 142 on the bracket or frame beside the dog, as shown in Fig. 4. The pusher 140 will be pressed inward so as to cause its tooth $n$ to enter the line of type in channel $e$ by means of a spring $Z$, connecting the tail of the pusher 140 to the lever 138 when said lever 138 is swung to the left. This movement of the pusher moves the roller $o$ out of engagement with the flange 142, and thereupon the spring forces the tooth of the dog into engagement with the type in channel $e$, this engagement being facilitated by reason of the described slight displacement of the type relative to each other, and the tooth $n$ enters and breaks the line of type a short distance in front of the point $g$, and as the lever 138 swings the pusher 140 farther to the left the latter forces all the type in the channel $e$ in front or to the left of the pusher into the channel $i$ of the type-line holder, thereby completely filling the latter, and the pusher moves the type sufficiently inward to prevent any possible locking of the line-holder 33 to the stationary part of containing-channel $e$ by the imperfect entrance of a type into the line-holder at the point $g$. As soon as the line-holder is shifted lever 138 and the pusher are retracted, and in swinging to the right the pin or roller $o$ on the pusher 140 catches behind a spring-actuated shoe 141, which causes the pusher to quickly disengage the line of type, and the shoe 141 does not release the pusher until it is brought back into position to be engaged with the rib 142, so that the pusher will be kept out of engagement with the line of type until it is again moved to the left by lever 138.

In order to permit the pusher to be rendered inoperative during the time of justifying the type in the holder 33 by hand, the lever 138 is preferably loosely journaled on the upper end of shaft 136 (see Fig. 9) and over a short arm 137, keyed to the shaft. A locking-tumbler 139 is pivoted to the lever 138 and is adapted to drop into a notch or recess in the arm 137, as shown, so as to cause lever 138 to vibrate with the arm 137 when locked thereto; but when it is desired to prevent the pusher operating tumbler 139 is raised, so as to disengage arm 137, and consequently the pusher will not be affected by the vibration of arm 137 until the tumbler is again thrown into locking position. This lever 138, as shown, is connected to the upper end of a substantially vertical shaft 136, on the lower end of which is a crank-arm 135, the end of which projects into a slot in the upper end of one arm of a bell-crank lever 134, pivoted on the keyboard-frame, and the other arm of lever 134 is engaged and operated by a pin $w$ on the lower arm of lever 20.

By the construction shown and described the line-pusher 140 is operated on the downward movement of lever 120, in which movement the pawl 27 is drawn back one notch. On the upward movement of lever 20 the line-pusher is retracted simultaneously with the rearward movement of the line-holder.

As above stated, one of the objects of the invention is to automatically stop the setting operation whenever the line-holder shall become filled with type, and this is accomplished by a key-locking mechanism which is automatically operated at the proper time, so as to prevent further manipulation of the keys, thereby preventing an overrun of type at the assembling-point. In this style of keyboard-machines as heretofore used a locking-plate 131 has been arranged beneath the key-levers $l$, and this plate has been usually provided with a hand-lever, by which it could be turned when desired into position to uphold the levers $l$ and prevent their depression by the keys, thus locking the keyboard. Such a plate is used in the present instance, but is automatically tripped as soon as the channels in the line-holder are filled by the following mechanism:

On the rock-shaft 35 may be keyed a finger 122, which is so adjusted relatively to the line-holder that when the ninth (or next to the last) channel $i$ in the holder 33 comes into register with the channel $e$ at the point $g$ this finger comes into position to contact with a vertically-movable rod 123, the lower end of which is connected to the short arm of a bell-crank lever 124, the longer arm of which is connected by a rod 125 to the lower end of a lever 126, which is pivoted to the keyboard-frame at one end of the cylinder $k$, and on this lever 126, near its lower end, is pivoted a rocking lever 127, the rear arm of which projects near to the lower bifurcation $s$ of lever 20 and the front arm of which is connected by a link 128 to an arm 129, attached to the locking-plate 131. This arm 129 is provided with a stop-pin $p$, which limits the movement of the plate 131 when the same is lowered to inoperative position, and when the plate is thrown up into locking position this pin engages a notch $q$ in the end of a catch 130, pivoted on the upper end of lever 126 and pressed downward by a spring, as shown. Lever 124 may be rocked forwardly by means of a spring $r$ and through its connections will swing lever 126 away from the shaft of the cylinder $k$ and keep the inner end of lever 127 normally out of position to contact with the bifurcation $s$ of lever 20.

When the ninth (or next to last) channel $i$ of the line-holder has been sufficiently filled with type and the stop-lever 83 tripped, sufficient type will be first moved into such channel $i$ from the composing-channel $e$ by the pusher 140, as above described, and the lever 20 is reciprocated to shift the line-holder so as to bring the last channel up into register with the channels $e$. This movement of the line-holder rocks the shaft 35 and causes finger 122 to depress rod 123 and, through the described connections 124 and 125, pull the lever 126 rearward, thereby moving lever 127 toward the end part $s$ of lever 20 and holding the same in such position that it will be struck by such part at the next operation of the lever 20. When the tenth (or last) channel $i$ in the line-holder has been filled with type sufficiently to operate the trip 83, the filling of the line is completed by the pusher 140, and simultaneously the lever 20 is rocked so as to move the line-holder forward and move the last line out of register with the channel $e$; but at this time upon the initial movement downward of lever 20 its end $s$ strikes the inner end of lever 127 and rocks the same, thereby (through its connections 128 and 129) turning the locking-plate 131 into position to lock the key-levers $l$, the catch 130 engaging pin 129 and arresting the locking-plate when it rises to the proper position to lock the lever $l$, whereupon it becomes impossible for the operator to overrun his assembling line and no more type can be ejected from the reservoir until the line-holder is reset. If the article that the operator is composing does not sufficiently fill the channel or line in the type-holder to trip the automatic locking mechanism, this operation can be completed at the operator's will by merely operating the tripping-lever 83 by hand. As soon as the line-holder 33 is thrown back to normal position and rod 123 is released by the finger 122 the locking-bar is returned to normal position by the spring $r$, which causes the lever 126 to move away from the lever 20 and draw the lever 127 out of the way of part $s$, and on this movement of the lever 126 catch $q$ engages pin $p$ and assists in returning the locking-plate 131 to normal position.

In order to prevent the type falling down in the channels $e$ or $i$ while being moved therein, and especially during the deflection of the channel $e$ between the points $f$ and $g$, a brush 46 is arranged at the side of the channel $e$, as shown in Fig. 3, and projects slightly into the channel, so as to uphold the type passing therethrough. Similarly a brush $t$ is attached to a bar 74, which is attached to a holder 73, pivoted on the machine, so that the brush $t$ will lie just above that channel $i$ of the line-holder into which the type are being forwarded. As a matter of convenience the lever 83 may be pivoted to an extension on the holder 73. This holder 73 is provided at one end with a thumb-piece 149, by which it can be rocked, so as to raise the brush $t$ out of the way and permit the line-holder 33 to be rocked forward with the type therein to undergo the process of justification by hand. This tilting upward of the brush-holder 73 is caused to automatically release the line-holder 33, (so that the same can drop forward by gravity) by means of a pin $u$ on the right-hand end of the plate 73, which engages beneath one arm of a rocking lever 28, pivoted on the frame, the other arm of said lever engaging the tail of the pawl 27, so that when the holder 73 is tilted upwardly lever 28 is rocked and the pawl 27 will be forced out of engagement with the ratchet 34, and thereupon the line-holder (owing to its continued overbalance) will drop forward or toward the operator until the first or rearmost channel therein comes into register with the channel $e$.

When the line-holder is brought back full of type, it is desirable to close the end of the channel $i$, leading into the holder 33, as well as the channel that leads away from the holder to the galley to prevent locking or "pieing" of the type in the holder 33. This may be done by a little dovetail piece 78, (see Figs. 7, 9, and 20,) guided in a slot in bracket 64 at the left-hand side, (and by a similar piece 78, guided in a slot in bracket 44 in the right side,) which is pushed forward by a spring 781 to close the channel when the brush-holder 73 is raised; but when the brush-holder is lowered a pin 731 thereon engages lugs or pins on the pieces 78 and retracts these pieces, so that the channels will only be closed when the brush-holder is raised.

The operation of the device is as follows: The incoming types are packed into the channel $e$, which directs the line into the channels of the line-holder. Between the points $f$ and $g$ the direction of the channel is changed about ninety degrees, and it is given a slight spiral twist, so that the type enter the line-holder standing at an angle of about twelve degrees to a perpendicular. When enough type have been assembled to nearly fill the channel of the line-holder, the end type comes into contact with the trip-lever 83 and moves it ahead of the line until the latter, through the various levers and connections described, disengages the lever 158 from the ratchet-pawl 23, and the pawl 23 being released is pulled by the spring into contact with the ratchet 21, thus causing the cam-disk 22 to revolve with the ratchet, and the cam 222, working in the forked end of lever 20, causes that lever to vibrate. When lever 20 is moved, it actuates lever 138 by means of the levers and connections described, and the resulting movement of lever 138, with the pusher 140, is toward the magazine. The pusher is at first held out of contact with the type in channel $e$; but as the pusher is moved toward the magazine the pin $o$ rides off the projecting part 142, allowing the tooth $n$ to engage and break the line of type in channel $e$ and push part of it into the line-holder. On the return stroke of lever 138 the pin $o$ in pusher 140 rides up the shoe 141 and throws the tooth $n$ out of contact with the line. The channel $e$ at this point being slightly spiral makes the type in advance overlap the one in its rear a small amount, and the brush placed on the back side of the channel $e$ forces the type against the front wall of the channel. When the pusher comes against the line, its tooth $n$ forces the type it strikes back to the rear wall, thus increasing the amount of overlap of the type in advance. Then the tooth $n$ slides along the type until it comes into contact with the overlapping type. Then the spring forces the tooth into the line between the two type, and the forward part of the line is pushed forward into the line-holder beyond the point $g$. During the upward stroke of lever 20 the line-holder is advanced one notch by pawl 27 to bring an empty channel into position to be filled. When the tenth channel of the line-holder is brought into position to be filled, the finger 122 depresses the rod 123, causing the lever 126 to be drawn into such a position that the next movement of lever 20 strikes the free end of lever 127 and depresses it, thereby raising the keyboard lock-bar into a perpendicular position, where it is retained by the latch 130. The last channel being filled, the described mechanisms are tripped, and the keyboard is thereupon locked to prevent the operator sending in any more type. The trip-lever 83, which is hinged at C, is thrown back to be out of the way when justifying and the brush raised to clear the type, and this operation actuates the lever 28, which in turn raises the pawls 27 and 26, releasing the line-holder, which falls forward, bringing the first channel into position to have the type removed and justified, the operator tripping the mechanism by hand for bringing a filled channel into position as he needs it. Upon the return of the line-holder to first position the finger 122, which is fastened to the line-holder shaft, is raised, allowing lever 126 to be brought to its normal position by a spring. The latch 130 being fastened to lever 126 draws the keyboard lock-bar over far enough for it to fall, thus releasing the keyboard mechanism. When the brush-holder 73 is raised and the line-holder is brought back full of type, the channel that leads into the line-holder, as well as the one that leads away from it to the galley, is closed by the pieces 78. Lugs or pins on the hubs of the brush-holder 73 engaging a similar lug or pin on the pieces 78 prevent their closing the channel except when the brush-holder is raised.

What I claim is—

1. In a type-setting machine the combination of a composing-channel, and a movable line-holder into which the type are forwarded from said channel as composed, the line-channel being slightly twisted opposite the pusher to facilitate engagement of the latter with the type; with an automatically-operating line-pusher adapted to suddenly move a number of type from the channel into the line-holder when the channel thereof is almost filled, substantially as described.

2. In a type-setting machine the combination with means for composing and forwarding a line of type in a channel, and a movable line-holder opposite the channel, into which the type are forwarded as composed, a line-pusher adapted to suddenly move a number of type from the channel into the line-holder, the line-channel being slightly twisted opposite the pusher to facilitate engagement of the latter with the type, and a trip for regulating the operation of said line-pusher, said trip being actuated by the type entering the line-holder when the latter is nearly filled, for the purpose and substantially as described.

3. The combination of the composing mechanism, a movable line-holder having a series of type-receiving channels, mechanism for shifting said holder so as to bring its channels successively into register with the composing-channel of the machine to receive type therefrom and mechanism for shifting the holder upon the completion of a line; with a keyboard-locking device and mechanism for automatically throwing said lock into operative position when all the channels in the holder have been filled.

4. In a type-setting machine the combination of the composing mechanism, a line-holder into which the composed type are ejected and mechanism for shifting said holder so as to bring the successive channels into register with the composing-channel; with mechanism whereby the keys are automatically locked when the channels in the line-holder are filled, substantially as described.

5. In a type-setting machine the combination of the composing mechanism, a line-holder into which the composed type are ejected and mechanism for shifting said holder so as to bring the successive channels into register with the composing-channel; with mechanism whereby the keys are automatically locked when the channels in the line-holder are filled and mechanism for automatically releasing the locking mechanism when the line-holder is reset.

6. The combination of composing mechanism, a movable line-holder into which the composed type are ejected, means for moving said holder so as to bring successive lines therein into register with the line-receiving channel, a key-locking mechanism, a trip adapted to be actuated by the incoming line of type in the holder and set the line-holder-shifting mechanism into operation, and mechanism controlled by the movement of the line-holder for actuating the key-locking mechanism when all the channels in the holder are full.

7. The combination of the composing mechanism, a channeled line-holder into which the composed type are ejected, and means for shifting said holder so as to bring the successive channels therein into register with the composing-channel, of a trip adapted to be operated by the incoming lines of type in the holder to release the holder-operating mechanism upon the completion of a line of type, and means for locking the keyboard and devices controlled by the movement of the line-holder for releasing the locking mechanism when all the channels in the holder are filled.

8. The combination of the composing mechanism, a movable line-holder having a series of type-receiving channels, mechanism for shifting said holder so as to bring its channels successively into register with the composing-channel of the machine to receive types therefrom and mechanism whereby the holder is shifted upon the completion of a line; with mechanism adapted to force sufficient type from the machine-channel into a channel of the holder to fill the same after the holder-shifting mechanism has been tripped but before the holder is shifted, and a keyboard-locking device and mechanism for automatically throwing said lock into operative position when all the channels in the holder have been filled.

9. The combination of the composing mechanism, a movable line-holder having a series of type-receiving channels, mechanism for shifting said holder so as to bring its channels successively into register with the composing-channel of the machine to receive type therefrom and automatically-operating mechanism actuated by an incoming line of type in the channels of the holder whereby the holder is shifted upon the completion of a line; with mechanism adapted to force sufficient type from the machine-channel into a channel of the holder to fill the same after the automatic mechanism has been tripped but before the holder is shifted, and a keyboard-locking device and mechanism for automatically throwing said lock into operative position when all the channels in the holder have been filled, substantially as described.

10. In a type-setting machine, the combination of the composing-channel and a rocking type-line holder into which the type, as composed, is ejected and held; with means for automatically shifting said line-holder so as to bring successive channels therein into register with the composing-channel, and means for resetting the holder after the channels therein are filled to permit justification of these composed type by hand and the removal thereof from the holder.

11. The combination of the composing mechanism and key-lever-actuating cylinder, a rocking line-holder provided with a series of channels, an oscillating lever, and connections for rocking said line-holder so as to bring successive channels into register with the composing-channel, a cam for oscillating said lever, and clutch connections for operating said cam from the said key-lever cylinder, substantially as described.

12. In a type-setting machine, the combination of the composing-channel, a line-holder having a series of channels adapted to be successively registered with the composing-channel and receive type therefrom, and means for shifting said holder; with a key-cylinder, a clutch mechanism for said key-cylinder adapted to cause it to actuate the line-holder mechanism, and a trip and connections for releasing said clutch, said trip being operated by the movement of type into the receiving-channel of the holder.

13. In a type-setting machine, the combination of a line-holder, means for ejecting the type into the channels thereof, and mechanism for shifting said line-holder so as to bring empty channels to the receiving-point; with a key-cylinder, a clutch mechanism for causing said key-cylinder to actuate the line-holder mechanism, a trip-lever beside the holder adapted to be actuated by an incoming line of type therein, and connections between said lever and the clutch mechanism whereby the latter mechanism is released upon the filling of the channel in the holder.

14. The combination of the composing-channel, a line-holder beside the same having a series of channels adapted to successively register with the composing-channel and receive type therefrom, and a lever, a cam and connections for shifting said line-holder; a rotating ratchet beside the cam, and a dog on the cam adapted to engage said ratchet; with a stop for holding said dog out of engagement with the ratchet, and a trip-lever and connections for releasing said dog, said trip-lever being operated by an incoming line of type in the channel of the holder, for the purpose and substantially as described.

15. The combination of the composing-channel, a line-holder beside the same having a series of channels adapted to successively register therewith and receive type therefrom, a rocking lever, a cam and connections for shifting said line-holder, a rotating ratchet beside the cam and a dog on the cam adapted to engage said ratchet; with a stop for holding said dog out of engagement with the ratchet, a rock-shaft and connections for operating said stop, and a trip-lever and connections for operating said rock-shaft, said trip-lever being operated by an incoming line of type in the channel of the holder when said channel is nearly filled, for the purpose and substantially as described.

16. The combination of the composing mechanism, the channeled line-holder, the lever and connections for operating said holder, a cam for operating said lever, a rotating cylinder, and clutch mechanism for locking said cylinder to said cam; with the trip-lever beside the holder adapted to be operated by an incoming line of type in the channel thereof, and connections whereby said trip-lever is caused to release the clutch when the channel of the holder is nearly filled with type, for the purpose and substantially as described.

17. In a type-setting machine, the combination of means for composing and forwarding a line of type in a channel, a movable line-holder beside the channel into which the type are forwarded as composed, and a line-pusher adapted to suddenly move a number of type from the channel into the line-holder, said channel being spirally twisted opposite the pusher to facilitate the separation of the lever by the pusher, substantially as and for the purpose described.

18. In a type-setting machine, the combination of means for composing and forwarding a line of type in a channel, a movable line-holder beside the channel into which the type are forwarded as composed, and a line-pusher adapted to suddenly move a number of type from a channel into the line-holder; with a lever carrying said pusher loosely mounted upon a rock-shaft, a crank-arm keyed to said shaft below said lever, and means for locking said lever to said arm.

19. The combination of a type-channel in which the lines of type are composed, said channel being laterally deflected or twisted near the exit end thereof, and a movable pusher beside said channel adapted to enter the type-line and eject a number of type from said channel, substantially as described.

20. The combination of a type-channel in which the lines of type are composed, a movable pusher beside said channel adapted to enter the type-line and eject a number of type from said channel, means for holding the pusher normally out of contact with the line, and means for forcing the pusher out of engagement with the line of type and normally holding it disengaged therefrom when retracted.

21. The combination of a type-channel in which the lines of type are composed, a movable pusher beside said channel adapted to enter the type-line and eject a number of type from said channel, means for holding the pusher normally out of contact with the line, and means for forcing the pusher out of engagement with the line of type when retracted; with a type-line holder into which the lines of type are ejected from the composing-channel, a trip-lever operated by the incoming line of type, and mechanism for operating said pusher indirectly controlled by said trip-lever, for the purpose and substantially as described.

22. The combination of a type-channel in which the lines of type are composed, a movable pusher beside said channel adapted to enter the type-line and eject a number of type from said channel, means for holding the pusher normally out of contact with the line, and means for forcing the pusher out of engagement with the line of type when it is retracted; with a type-line holder into which the lines of type are ejected from the composing-channel, a trip-lever located near the discharge end of the holder and adapted to be operated by the incoming line of type, mechanism for operating said holder, and mechanism for operating said pusher, both mechanisms being indirectly controlled and released at the proper time by said trip-lever, for the purpose and substantially as described.

23. The combination of the composing mechanism and a channel in which the composed lines are assembled, a movable pusher beside said channel adapted to enter the type-line and eject a number of type from said channel, a pin on said pusher engaging a stationary part on the frame and holding the pusher normally out of contact with the line of type when retracted, and a spring-actuated finger adapted to throw the pusher out of engagement with the line of type when it is retracted.

24. The combination of the composing mechanism and a channel in which the composed lines are assembled, said channel being slightly spirally deflected near the exit end thereof, and a movable pusher beside said channel adapted to enter the type-line and eject a number of type from said channel; a loosely-pivoted lever carrying said pusher, a vibrating lever below the loose lever and means for locking the levers together; with means for holding the pusher normally out of contact with the line of type and means for throwing the pusher out of engagement with the line of type when it is retracted.

25. The combination of a composing-channel, a movable pusher beside said channel adapted to enter the type-line and eject a number of type from said channel and mechanism for operating said pusher; with a type-line holder into which the lines of type are ejected from the composing-channel, mechanism for moving said holder to bring successive channels therein into register with the composing-channel, and a trip-lever adapted to be operated by the incoming line of type in said holder, said pusher and holder operating mechanisms being indirectly controlled by said trip-lever.

26. The combination of a movable type-line holder, and an adjustable brush beside and partly overlying that channel of the holder into which the type are being entered, for the purpose of preventing the type falling; with means for raising said brush to permit the holder to be brought back to normal position when full of type, substantially as and for the purpose described.

27. The combination of a composing-channel, and a movable type-line holder, and a brush overlying that channel of the holder into which the type are being admitted for the purpose of preventing falling of the type; with means for shifting the line-holder and means for raising the brush to permit the holder to be swung back to normal position, substantially as and for the purpose described.

28. The combination of a composing-channel, a brush for upholding the type therein, and means for ejecting type therefrom; with a movable type-line holder, and an adjustable brush for overlying the channel of the holder in which the type are moving for the purpose of preventing falling of the type; with means for shifting the line-holder and means for raising the brush to permit the holder to be swung back thereunder to normal position when full of type.

29. The combination of a composing-channel, a movable type-line holder, an adjustable brush overlying that channel of the holder into which the type are being admitted for the purpose of preventing falling of the type, and means for shifting the line-holder, means for raising the brush to permit the holder to be swung back thereunder to normal position when full of type, a trip-lever adapted to be operated by the incoming line of type, and connections whereby said trip-lever releases the holder-shifting mechanism when the channel of the holder is about filled with type, substantially as described.

30. The combination of a composing-channel, a movable type-line holder, an adjustable brush overlying that channel of the holder into which the type are being admitted to prevent falling of the type, and means for intermittently advancing the line-holder as its channels are filled; with a trip-lever pivoted on said brush and adapted to be operated by the incoming line of type, connections whereby said lever releases the holder-shifting mechanism when the channel of the holder is about filled with type, and means for raising the brush to permit the holder to be swung back to normal position when full of type, substantially as described.

31. The combination of the composing mechanism, a movable holder into which the type are advanced as composed, a brush overlying the holder and the devices operated by the brush to close the inlet and outlet channels when the brush is thrown back.

32. The combination of the composing mechanism, a movable holder provided with a series of channels into which the type are advanced as composed, a brush overlying that channel of the holder into which the types are being moved, and devices to close the ends of the inlet and outlet channels when the brush is thrown back.

33. The combination of the composing-channel, the rocking line-holder beside the same having a series of channels adapted to register therewith, and the ratchet-and-pawl mechanism for moving said holder; with a pivoted lever beside one end of the holder adapted when operated to cause the pawls to disengage the line-holder to permit the same to drop forward, substantially as described.

34. The combination of the composing-channel, the rocking line-holder beside the same having a series of channels adapted to register therewith, the ratchet-and-pawl mechanism for moving said holder, and the brush pivoted beside the holder and above that channel thereof into which the types are being advanced; with a pivoted lever near one end of the brush-holder adapted to be operated by the brush when the latter is thrown back, said lever, in turning, causing the pawls to disengage the line-holder and permit the same to drop forward by gravity, for the purpose and substantially as described.

35. The combination of mechanism for composing type, a channel into which the composed type are moved, a line-holder having a series of channels adapted to register with said composing-channel to receive the type therefrom, mechanism for moving said line-holder so as to bring its channels successively into register with the composing-channel, a trip operated by the incoming line of type and connections whereby said trip releases the line-holder-shifting mechanism; with a keyboard-lock and devices controlled by the line-holder whereby said lock is thrown into operative position upon the filling of all the channels in the line-holder, substantially as described.

36. The combination of a composing-channel, a line-holder having a series of channels adapted to register with said composing-channel to receive the type therefrom, mechanism for ejecting a number of type from said composing-channel into the line-holder channel when said latter channel is nearly filled, mechanism for moving said line-holder so as to bring its channels successively into register with the composing-channel, a trip operated by the incoming line of type and connections whereby said trip releases the line-holder-shifting mechanism and the line-forwarding mechanism said pusher operating before the holder is shifted; with a keyboard-lock and devices controlled by the line-holder whereby said lock is thrown into operative position upon the filling of all the channels in the line-holder, substantially as described.

In testimony that I claim the foregoing as my own I affix my signature in presence of two witnesses.

PAUL FLEMMING COX.

Witnesses:
J. WARREN PIKE,
WILL. A. CADY.